(12) United States Patent
Hirata et al.

(10) Patent No.: US 8,806,870 B2
(45) Date of Patent: Aug. 19, 2014

(54) CARBON-DIOXIDE-RECOVERY-TYPE THERMAL POWER GENERATION SYSTEM AND METHOD OF OPERATING THE SAME

(75) Inventors: Haruhiko Hirata, Yokohama (JP); Hideo Kitamura, Tokyo (JP); Takashi Ogawa, Yokohama (JP); Yukio Ohashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

(21) Appl. No.: 13/282,853

(22) Filed: Oct. 27, 2011

(65) Prior Publication Data

US 2012/0240579 A1    Sep. 27, 2012

(30) Foreign Application Priority Data

Mar. 23, 2011    (JP) .................. 2011-064499

(51) Int. Cl.
*F01K 13/02*    (2006.01)
*F01K 17/00*    (2006.01)

(52) U.S. Cl.
USPC ............... 60/646; 60/648; 60/653; 60/657; 60/677

(58) Field of Classification Search
USPC ............... 60/646, 648, 653, 657, 677–679; 96/236; 423/220; 110/215, 234
See application file for complete search history.

(56) References Cited

U.S. PATENT DOCUMENTS 5,001,902 A * 3/1991 Garbo ............... 60/648
5,233,837 A * 8/1993 Callahan ............ 62/621
5,344,627 A * 9/1994 Fujii et al. .......... 423/220
6,883,327 B2   4/2005 Iijima et al.
2010/0205964 A1   8/2010 Maddaus et al.
2010/0326074 A1* 12/2010 Okita et al. ........ 60/648

FOREIGN PATENT DOCUMENTS

| | | |
|---|---|---|
| GB | 2470645 A | 12/2010 |
| JP | 03-193116 | 8/1991 |
| JP | 07-232033 | 9/1995 |
| JP | 2006-213580 | 8/2006 |
| JP | 2010275925 A | 12/2010 |
| WO | 2011062710 A2 | 5/2011 |

OTHER PUBLICATIONS

European Search Report for European Patent Application EP11186390.8 dated Jul. 16, 2012.

(Continued)

*Primary Examiner* — Hoang Nguyen
(74) *Attorney, Agent, or Firm* — Patterson & Sheridan, LLP

(57) ABSTRACT

According to one embodiment, a carbon-dioxide-recovery-type thermal power generation system includes an absorption column allows carbon dioxide contained in exhaust gas from a boiler to be absorbed in an absorption liquid, a regeneration column that discharges a carbon dioxide gas from the absorption liquid supplied from the absorption column, a reboiler that heats the absorption liquid discharged from the regeneration column and supplies steam generated, to the regeneration column, a condenser that generates condensate by cooling the steam exhausted from a turbine, a heater that heats the condensate, a water supply pump that supplies the condensate to the boiler, a line through the steam extracted from the turbine is supplied to the reboiler and the heater, and a steam flow rate adjusting unit. The steam flow rate adjusting unit maintains an amount of steam, which is extracted from the turbine through the line, to be constant.

11 Claims, 4 Drawing Sheets

(56) References Cited

OTHER PUBLICATIONS

Pfaff et al. "Optimised Integration of Post-Combustion CO2 Capture Process in Greenfield Power Plants", Energy, Oct. 1, 2010, pp. 4030-4041, vol. 35, No. 10, Pergamon Press, Oxford, GB.

Australian Office Action dated Sep. 28, 2012 filed in Australian Counterpart Application No. 2011236132, 5 pages.
Chinese Office Action dated Mar. 3, 2014, filed in Chinese counterpart Application No. 201110328338.6, 15 pages (with translation).
Japanese Office Action dated Apr. 1, 2014, filed in Japanese counterpart Application No. 2011-064499, 6 pages (with translation).

* cited by examiner

CARBON-DIOXIDE-RECOVERY-TYPE THERMAL POWER GENERATION SYSTEM AND METHOD OF OPERATING THE SAME

CROSS REFERENCE TO RELATED APPLICATION

This application is based upon and claims benefit of priority from the Japanese Patent Application No. 2011-64499, filed on Mar. 23, 2011, the entire contents of which are incorporated herein by reference.

FIELD

Embodiments described herein relate generally to a carbon-dioxide-recovery-type thermal power generation system and a method of operating a carbon-dioxide-recovery-type thermal power generation system.

BACKGROUND

With an increase in consumption of fossil fuels, the problem of global warming, which is considered to be caused by the greenhouse effect caused by carbon dioxide, which is the combustion product of fossil fuels, has come to be serious. Meanwhile, the following methods have been studied for thermal power plants and the like that use a large amount of fossil fuels: a method of separating and recovering carbon dioxide contained in combustion exhaust gas by bringing the combustion exhaust gas into contact with an amine-based absorption liquid and a method of storing the recovered carbon dioxide without discharging the recovered carbon dioxide into the air.

As a specific system that separates and recovers carbon dioxide, there is known a system that includes an absorption column and a regeneration column. The absorption column allows carbon dioxide that is contained in an exhaust gas to be absorbed in an absorption liquid. The regeneration column discharges the carbon dioxide by heating the absorption liquid (rich liquid), which contains the absorbed carbon dioxide and is supplied from the absorption column, by a reboiler, and recycles the absorption liquid used once into an absorption liquid (lean liquid) that does not contain the carbon dioxide through the discharge of the carbon dioxide from the used absorption liquid. Then the regenerated absorption liquid is circulated in the absorption column.

There has been proposed methods using steam as a heat source of the reboiler for this system: a method in which the steam extracted from a low-pressure turbine or the steam exhausted from a second intermediate-pressure turbine are used as the heat source, a method in which the steam exhausted or extracted from a turbine for driving a compressor to compress or cool the carbon dioxide is used as the heat source, and a method in which the steam extracted from an intermediate stage of a turbine is used as the heat source, and the like.

Further, there has been proposed a system that supplies steam, which is extracted from an intermediate stage of an existing turbine, to the added turbine when a new turbine is added to an existing power generation plant in order to increase an output.

It is considered a case of a carbon dioxide separation recovery system is simultaneously installed together with a power generation system that includes a boiler, a turbine, a generator, and the like; and a case of a carbon dioxide separation recovery system is added to an existing power generation system.

When a carbon dioxide separation recovery system is added to an existing power generation system, it is very important from which portion of an existing power generation system a heat source is taken to the reboiler of a carbon dioxide separation recovery system. A new steam line, a new second intermediate-pressure turbine, or a new turbine for driving a compressor to compress or cool the carbon dioxide are required to be installed in all of the above-mentioned related arts, in order to supply a heat source to a reboiler. Modifications for these are not easy.

Further, when steam is extracted from an intermediate stage of an existing turbine and supplied to a reboiler, the pressure balance of an existing turbine is lost. For this reason, it is difficult to maintain the same performance of a turbine as that was obtained before a carbon dioxide separation recovery system is added.

Furthermore, in the operation of a general power generation system, it is important to maintain an electrical output corresponding to a power supply command. However, in the above-mentioned related arts, the amount of steam supplied to a turbine from a boiler for driving a generator is changed due to the change of the amount of steam supplied to a reboiler of a carbon dioxide separation recovery system, so that the electrical output has been changed. As described above, in the past, there have been problems in that and it was difficult to separate and recover carbon dioxide with maintaining the appropriate electrical output corresponding to the power supply command with preventing the deteriorating of the tubine performance.

DETAILED DESCRIPTION

According to one embodiment, a carbon-dioxide-recovery-type thermal power generation system includes a boiler that produces steam and generates an exhaust gas by combusting fuel, an absorption column that is supplied with the exhaust gas from the boiler and allows carbon dioxide that is contained in the exhaust gas to be absorbed in an absorption liquid, a regeneration column that is supplied with the absorption liquid containing the absorbed carbon dioxide from the absorption column, allowing a carbon dioxide gas to be discharged from the absorption liquid, and discharges the carbon dioxide gas, a reboiler that heats the absorption liquid discharged from the regeneration column and supplies steam generated, to the regeneration column, a turbine that is supplied with the steam from the boiler and is rotationally driven, a condenser that generates condensate by cooling the steam exhausted from the turbine, a condensate pump that sends the condensate to a first line, a heater that is provided on the first line and heats the condensate, a water supply pump that supplies the condensate, which has been heated by the heater, to the boiler, a second line through the steam extracted from the turbine is supplied to the reboiler and the heater, and a steam flow rate adjusting unit. The steam flow rate adjusting unit maintains an amount of steam, which is extracted from the turbine through the second line, to be constant.

Embodiments of the invention will be described below with reference to the drawings.

First Embodiment

Figure 1:
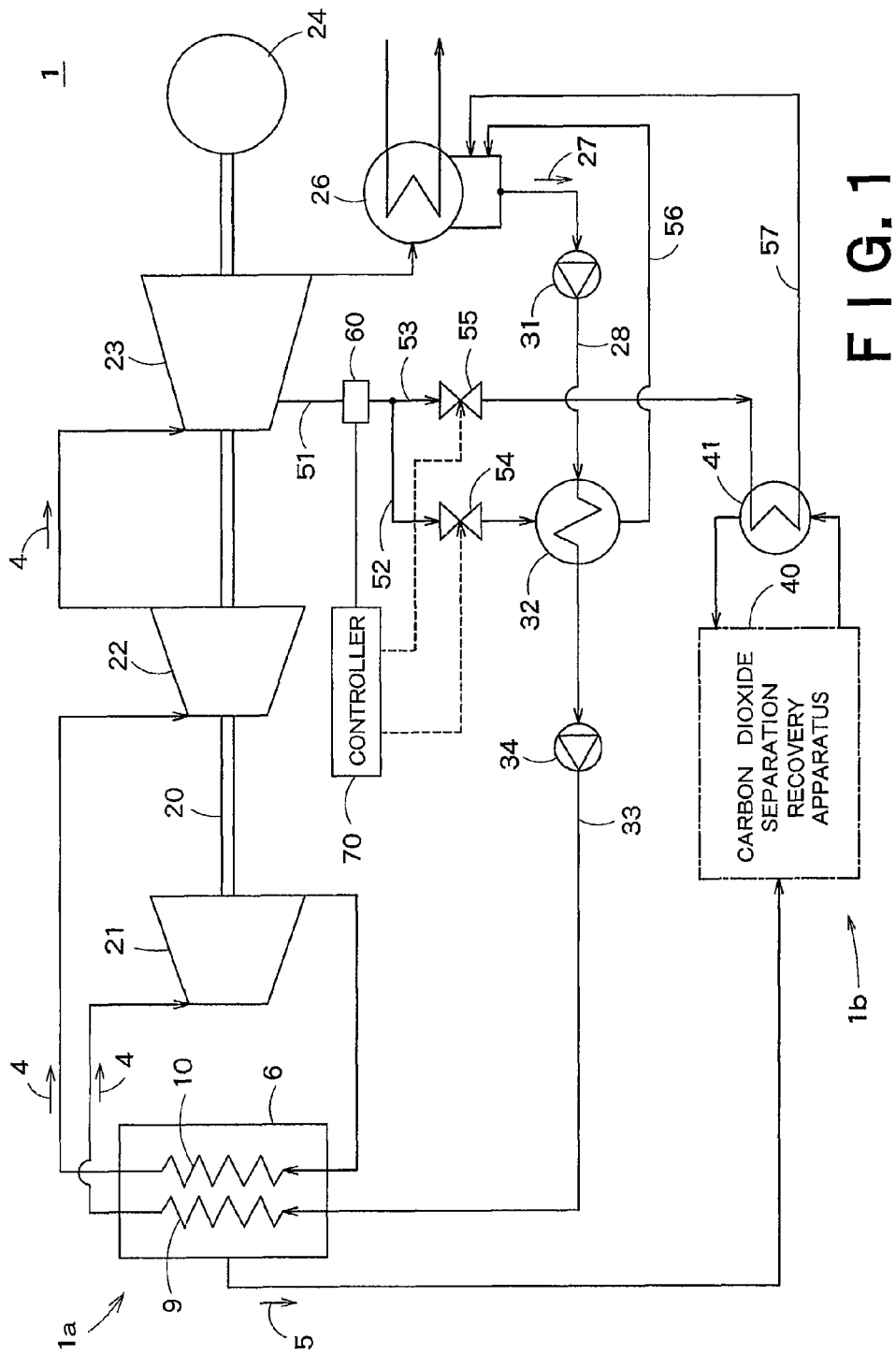
FIG. 1 is a diagram illustrating the schematic structure of a carbon-dioxide-recovery-type thermal power generation system according to a first embodiment of the invention.

FIG. 1 illustrates the entire structure of a carbon-dioxide-recovery-type thermal power generation system according to a first embodiment of the invention. The carbon-dioxide-recovery-type thermal power generation system 1 includes a thermal power generation plant 1a and a carbon dioxide recovery plant 1b. The thermal power generation plant 1a generates turbine steam 4 through the combustion of fuel and generates power with the turbine to be rotated by the turbine steam 4. The carbon dioxide recovery plant 1b recovers carbon dioxide from an exhaust gas 5, which is generated in a boiler 6, by using an absorption liquid that absorbs carbon dioxide contained in the exhaust gas 5.

The boiler 6 is supplied with fuel and air for combustion and fuel is combusted in a furnace, so that turbine steam 4 and the exhaust gas 5 are generated. The boiler 6 includes a heater 9 and a reheater 10. The heater 9 generates main steam by heating the turbine steam 4 through the combustion in the furnace. The reheater 10 is provided adjacent to the heater 9, and generates reheat steam by reheating the turbine steam 4 that is supplied from the heater 9 through a high-pressure steam turbine 21 to be described below.

The thermal power generation plant 1a includes a high-pressure steam turbine (high-pressure turbine) 21 and an intermediate-pressure steam turbine (intermediate-pressure turbine) 22. The high-pressure turbine 21 is rotationally driven by the turbine steam 4 (main steam) that is supplied from the heater 9 of the boiler 6. The intermediate-pressure turbine 22 is connected to the high-pressure turbine 21 by a turbine shaft 20, and is rotated by the turbine steam 4 (reheat steam) that is supplied from the high-pressure turbine 21 through the reheater 10 of the boiler 6. Further, a low-pressure steam turbine (low-pressure turbine) 23 is connected to the intermediate-pressure turbine 22 by the turbine shaft 20. The low-pressure turbine 23 is adapted to be rotated by the turbine steam 4 (exhaust steam discharged from the intermediate-pressure turbine 22) supplied from the intermediate-pressure turbine 22. Furthermore, a generator 24, which generates power by the rotation of the turbine shaft 20, is connected to the turbine shaft 20.

Meanwhile, in this embodiment, the rotating shafts of the high-pressure turbine 21, the intermediate-pressure turbine 22, the low-pressure turbine 23, and the generator 24 have been connected to each other so as to form one turbine shaft 20. However, the invention is not limited to this structure. The thermal power generation plant 1a may includes two or more turbine shafts, each which includes at least one steam turbine, and a plurality of generators connected to the respective turbine shafts.

A condenser 26, which generates condensate 27 by cooling and condensing the turbine steam (exhaust steam discharged from the low-pressure turbine 23) discharged from the low-pressure turbine 23 with cooling water such as seawater, is provided on the lower portion of the low-pressure turbine 23.

The condensate 27 discharged from the condenser 26 is sent to the downstream side of a line 28 by a condensate pump 31 and heated by a heater 32. Then, the condensate 27 is sent to the boiler 6 through a line 33 by a water supply pump 34. The heater 32 has a function of increasing the thermal efficiency of the thermal power generation plant 1a by reducing the consumption of fuel, which is used to generate steam in the boiler 6, through the previous temperature rise of water supplied to the boiler.

The heater 32 is supplied with steam (low-pressure steam) that is extracted from the low-pressure turbine 23 through lines 51 and 52. A valve 54 is provided on the line 52, and is adapted to be capable of adjusting the amount of low-pressure steam that is supplied to the heater 32. The heater 32 heats the condensate 27 by using the low-pressure steam as a heat source. The drain discharged from the heater 32 is supplied to the condenser 26 through a line 56.

Further, since the line 51 is branched into the line 52 and a line 53, the low-pressure steam extracted from the low-pressure turbine 23 is supplied to a reboiler 41 to be described below through the lines 51 and 53. A valve 55 is provided on the line 53, and is adapted to be capable of adjusting the amount of low-pressure steam that is supplied to the reboiler 41. The drain discharged from the reboiler 41 is supplied to the condenser 26 through a line 57.

A flowmeter 60, which measures the flow rate of steam, is provided on the line 51. The flowmeter 60 transmits a measurement result to a controller 70. The controller 70 controls the opening of the valves 54 and 55 on the basis of the measurement result of the flowmeter 60 so that the amount of steam extracted from the low-pressure turbine 23 becomes almost constant. A method of controlling the amount of steam extracted from the low-pressure turbine 23 by using a steam flow rate controlling unit, which includes the flowmeter 60, the controller 70, and the valves 54 and 55, will be described below.

As shown in FIG. 1, the carbon dioxide recovery plant 1b is provided with a carbon dioxide separation recovery apparatus 40 that is supplied with the exhaust gas 5 from the boiler 6 and separates and recovers carbon dioxide contained in the exhaust gas 5.

Figure 2:
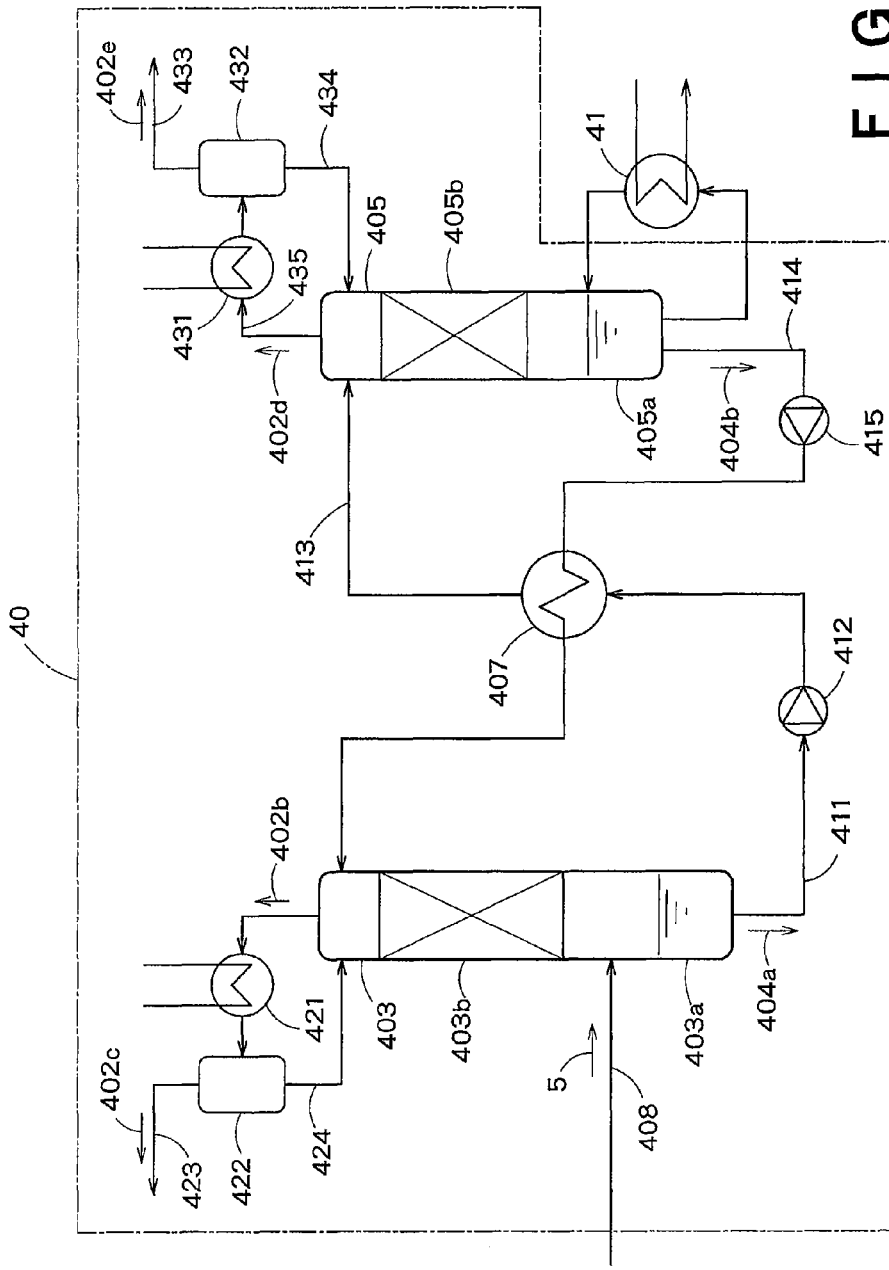
FIG. 2 is a diagram illustrating the schematic structure of a carbon dioxide separation recovery apparatus.

FIG. 2 illustrates the schematic structure of the carbon dioxide separation recovery apparatus 40. The carbon dioxide separation recovery apparatus 40 includes an absorption column 403 and a regeneration column 405. The absorption column 403 allows carbon dioxide contained in the exhaust gas 5 to be absorbed in the absorption liquid. The regeneration column 405 is supplied with the absorption liquid (hereinafter, referred to as a rich liquid 404a) having absorbed carbon dioxide from the absorption column 403, and regenerates the absorption liquid by allowing a carbon dioxide gas, which contains water vapor, to be discharged from the absorption liquid through the heating of the rich liquid 404a and discharging an exhaust gas 402d that contains a carbon dioxide gas and water vapor.

The exhaust gas 5 is supplied to the lower portion of the absorption column 403 from the boiler 6 through an exhaust gas introduction line 408, and an exhaust gas 402b from which carbon dioxide has been removed is discharged from the top portion of the absorption column 403.

The absorption column 403 includes an absorption column tank 403a for storing the rich liquid 404a that is generated by allowing the absorption liquid to absorb carbon dioxide. Likewise, the regeneration column 405 includes a regeneration column tank 405a for storing the absorption liquid (hereinafter, referred to as a lean liquid 404b) that is regenerated by allowing the rich liquid 404a to discharge a carbon dioxide gas.

Here, for example, an amine compound aqueous solution, which is obtained by dissolving an amine compound in water, is used as the absorption liquid that can absorb carbon dioxide.

As shown in FIG. 2, a reboiler 41 is installed with the regeneration column 405. The reboiler 41 allows the temperature of the lean liquid to rise and generates vapor by heating a part of the lean liquid 404b, which is stored in the regeneration column tank 405a, by using the steam, which is extracted from the low-pressure turbine 23, as a heat source. Then, the reboiler 41 supplies the vapor to the regeneration column 405.

When the lean liquid 404b is heated in the reboiler 41, a carbon dioxide gas is discharged from the lean liquid 404b and supplied to the regeneration column 405 together with the vapor of the absorption liquid. The vapor of the absorption liquid ascends in the regeneration column 405 while passing through a packed bed 405b, and heats the rich liquid 404a. Accordingly, a carbon dioxide gas is discharged from the rich liquid 404a. The packed bed 405b is made of a material that has, for example, the porous structure, the honeycomb structure, or the like, and may have a function of disturbing the absorption liquid that passes through the packed bed 405b.

The exhaust gas 402d, which contains the vapor of the absorption liquid and a carbon dioxide gas discharged from the regeneration column 405, passes through a gas line 435 and the moisture contained in the exhaust gas is condensed by a gas cooler 431. Then, the exhaust gas is separated into a carbon dioxide gas and return water, which contains the component of the absorption liquid, by a gas-liquid separator 432. The carbon dioxide gas 402e separated by the gas-liquid separator 432 is discharged through a recovered carbon dioxide discharge line 433 and stored in a storage facility (not shown). Further, the return water separated by the gas-liquid separator 432 returns to the regeneration column 405 through a return line 434.

A regenerative heat exchanger 407 is provided between the absorption column 403 and the regeneration column 405. The regenerative heat exchanger 407 heats the rich liquid 404a, which is supplied to the regeneration column 405 from the absorption column 403, by using the lean liquid 404b, which is supplied to the absorption column 403 from the regeneration column 405, as a heat source. Accordingly, the heat of the lean liquid 404b is recovered. Here, when a carbon dioxide gas is discharged from the rich liquid 404a in the regeneration column 405, the rich liquid 404a is heated by using high-temperature steam, which is supplied from the reboiler 41, as a heat source, as described above. Accordingly, the temperature of the lean liquid 404b, which is supplied to the regenerative heat exchanger 407, is relatively high, and the lean liquid 404b is used as a heat source.

A rich liquid line 411 through which the rich liquid 404a is supplied to the regenerative heat exchanger 407 from the bottom portion of the absorption column tank 403a is connected between the absorption column 403 and the regenerative heat exchanger 407. A rich liquid pump 412, which feeds the rich liquid 404a from the absorption column 403 to the regenerative heat exchanger 407, is provided on the rich liquid line 411.

A rich liquid line 413 through which the rich liquid 404a is supplied to the upper portion of the regeneration column 405 from the regenerative heat exchanger 407 is connected between the regenerative heat exchanger 407 and the regeneration column 405.

A lean liquid line 414 through which the lean liquid 404b is supplied to the regenerative heat exchanger 407 from the bottom portion of the regeneration column tank 405a is connected between the regeneration column 405 and the regenerative heat exchanger 407. A lean liquid pump 415, which feeds the lean liquid 404b from the regeneration column 405 to the regenerative heat exchanger 407, is provided on the lean liquid line 414.

The lean liquid 404b from the regenerative heat exchanger 407 is fed to the upper portion of the absorption column 403.

The absorption liquid, which is supplied to the upper portion of the absorption column 403, descends toward the absorption column tank 403a from the upper portion in the absorption column 403. Meanwhile, the exhaust gas 5, which is supplied to the absorption column 403, ascends from the lower portion toward the top portion in the absorption column 403. For this reason, the absorption liquid and the exhaust gas 5 containing carbon dioxide come into countercurrent contact (direct contact) with each other in a packed bed 403b, so that the absorption liquid absorbs the carbon dioxide contained in the exhaust gas 5. As a result, the rich liquid 404a is generated. The combustion exhaust gas 402b from which carbon dioxide has been removed is discharged from the top portion of the absorption column 403, and the rich liquid 404a is stored in the absorption column tank 403a of the absorption column 403. The packed bed 403b is made of a material that has, for example, the porous structure, the honeycomb structure, or the like, and may have a function of disturbing the absorption liquid that passes through the packed bed 403b.

After the combustion exhaust gas 402b discharged from the top portion of the absorption column 403 is cooled by a gas cooler 421 so that the moisture contained in the combustion exhaust gas 402b is condensed, the combustion exhaust gas 402b is separated into an exhaust gas and return water, which contains the component of the absorption liquid, by a gas-liquid separator 422. The exhaust gas 402c separated by the gas-liquid separator 422 is discharged to the outside of the system through an exhaust gas discharge line 423, and the return water returns to the absorption column 403 through a return line 424.

Next, a method of adjusting the opening of the valves 54 and 55 by the controller 70 will be described with reference to FIG. 1. In this embodiment, when changing the opening of the valves 54 and 55, the controller 70 adjusts the opening of the valves 54 and 55 so that the amount of steam extracted from the low-pressure turbine 23 is not changed significantly before and after the change of the opening of the valves 54 and 55.

When the controller 70 opens the valve 54 to a nearly fully open position and closes the valve 55 to a nearly fully close position, all the steam extracted from the low-pressure turbine 23 is supplied to the heater 32. In this case, since the temperature of the water supplied to the boiler is highest, it is possible to increase the thermal efficiency of the thermal power generation plant 1a to the highest.

When the controller 70 increases the opening of the valve 55 in a stepped manner and decreases the opening of the valve 54 in a stepped manner on the basis of the measurement result of the flowmeter 60 so that the amount of steam extracted from the low-pressure turbine 23 becomes constant, it is possible to increase the amount of carbon dioxide recovered in the carbon dioxide recovery plant 1b (the carbon dioxide separation recovery apparatus 40) in a stepped manner while maintaining the amount of steam passing through the high-pressure turbine 21, the intermediate-pressure turbine 22, and the low-pressure turbine 23 substantially constant.

When the controller closes the valve 54 to a nearly fully close position so that all the steam extracted from the low-pressure turbine 23 is guided to the reboiler 41, it is possible to increase the amount of carbon dioxide recovered in the carbon dioxide separation recovery apparatus 40 to the highest.

Meanwhile, since it is possible to easily estimate the conditions of temperature and pressure of the steam extracted from the low-pressure turbine 23, it is possible to easily find a relationship between the opening of the valves 54 and 55 and flow rates at the valves based on the conditions of steam in advance. Accordingly, since it is possible to easily adjust the valves 54 and 55 so that the amount of steam extracted from the low-pressure turbine 23 is maintained substantially constant, the flowmeter 60 may be omitted from the configuration.

In general, if the amount of steam extracted from a turbine is changed, an optimal relationship between the amount of steam and turbine blades designed for the flow rate of steam is lost. As a result, the performance of the turbine will be deteriorated. However, since the amount of steam extracted from the low-pressure turbine 23 can be maintained substantially constant in this embodiment, the low-pressure turbine 23 can be operated as designed. Accordingly, it is possible to supply steam to the reboiler 41 of the carbon dioxide separation recovery apparatus 40 from the low-pressure turbine 23 with preventing the deteriorating of performance of the low-pressure turbine 23.

According to this structure, it is possible to easily perform a control, which changes the amount of carbon dioxide recovered in the carbon dioxide recovery plant 1b and the thermal efficiency of the thermal power generation plant 1a, while maintaining the electrical output received by a power supply command without the deterioration of the performance of an existing low-pressure turbine.

Further, the heater 32, which heats the condensate 27, is generally installed in a thermal power generation plant. For this reason, it is possible to easily add the carbon dioxide recovery plant 1b to the existing thermal power generation plant 1a only by branching the line 53, which includes the valve 55, from the line 51, connecting the line 53 to the reboiler 41, and installing the line 57 that guides the drain from the reboiler 41 to the condenser 26.

Second Embodiment

Figure 3:
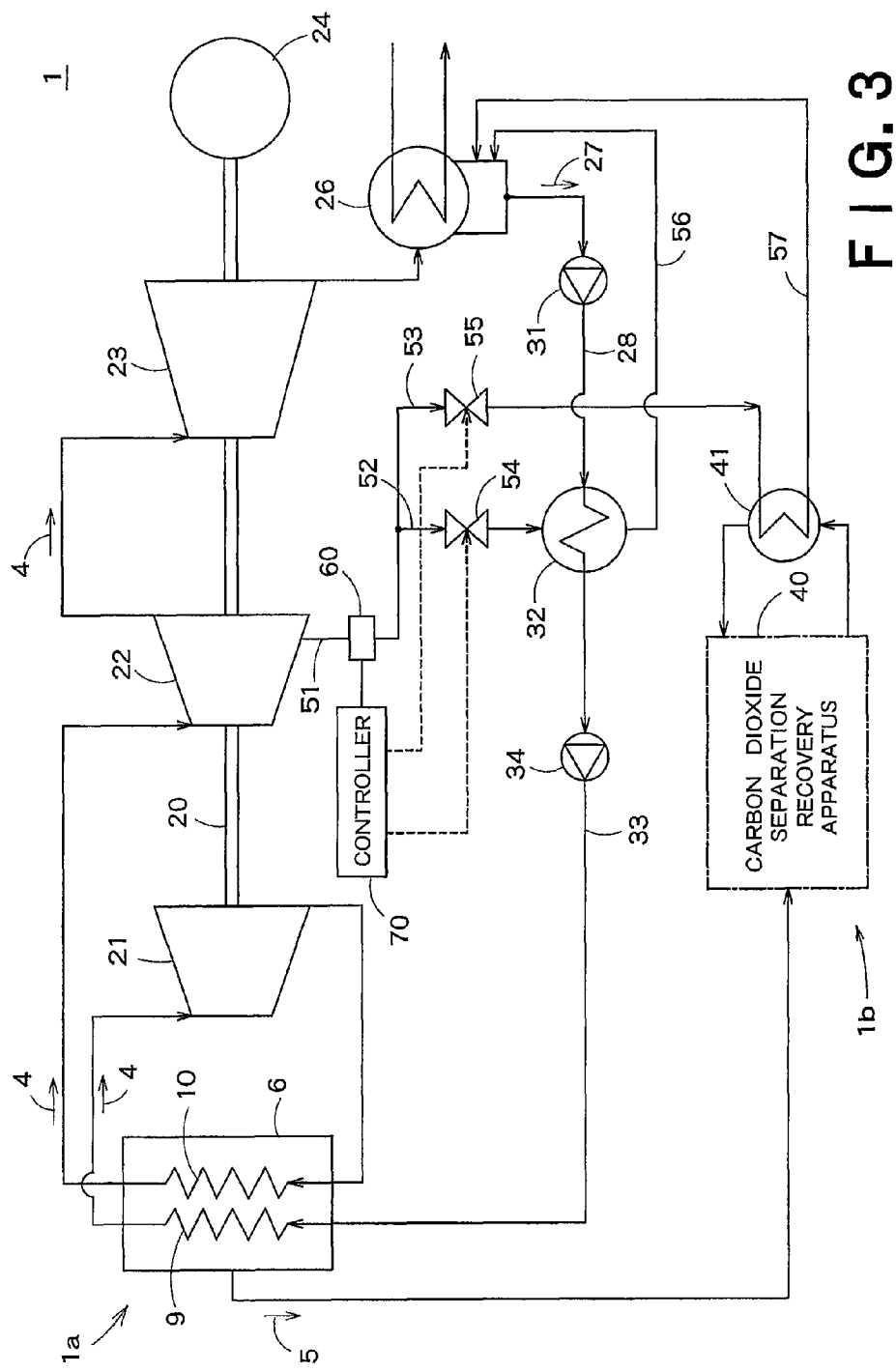
FIG. 3 is a diagram illustrating the schematic structure of a carbon-dioxide-recovery-type thermal power generation system according to a second embodiment of the invention.

FIG. 3 shows the schematic structure of a carbon-dioxide-recovery-type thermal power generation system according to a second embodiment of the invention. This embodiment is different from the first embodiment shown in FIG. 1 in that steam is extracted from an intermediate-pressure turbine 22. In FIG. 3, the same portions as those of the first embodiment shown in FIG. 1 are denoted by the same reference numerals. The description thereof will be omitted.

An amine compound aqueous solution, which is used in a carbon dioxide separation recovery apparatus 40 as an absorption liquid, has temperature characteristics as for the absorption and discharge of carbon dioxide. In particular, as for the discharge of carbon dioxide, it is preferable that the temperature of the absorption liquid be high. The temperature of intermediate-pressure steam extracted from an intermediate-pressure turbine 22 is higher than that of low-pressure steam extracted from a low-pressure turbine 23. When the performance of the absorption liquid is improved by the supply of the intermediate-pressure steam to a reboiler 41, steam supplied to the reboiler 41 is extracted from the intermediate-pressure turbine 22 as in this embodiment.

The amount of steam, which is to be extracted from the intermediate-pressure turbine 22, is maintained constant by the adjustment of the opening of valves 54 and 55 that is performed by a controller 70. Accordingly, it is possible to separate and recover carbon dioxide by the carbon-dioxide-recovery-type thermal power generation system according to this embodiment while preventing the performance of a turbine from deteriorating. Further, it is possible to improve the performance of the absorption liquid of the carbon dioxide separation recovery apparatus 40.

Meanwhile, since the absorption liquid of the carbon dioxide separation recovery apparatus 40 has thermal deterioration characteristics, it is preferable that the temperature of thermal supplied to the reboiler 41 be determined depending on thermal deterioration characteristics and carbon dioxide discharging characteristics of the absorption liquid.

The structure that extracts steam from the low-pressure turbine 23 has been described in the first embodiment and the structure that extracts steam from the intermediate-pressure turbine 22 has been described in the second embodiment. However, steam may be extracted from the high-pressure turbine 21.

Third Embodiment

Figure 4:
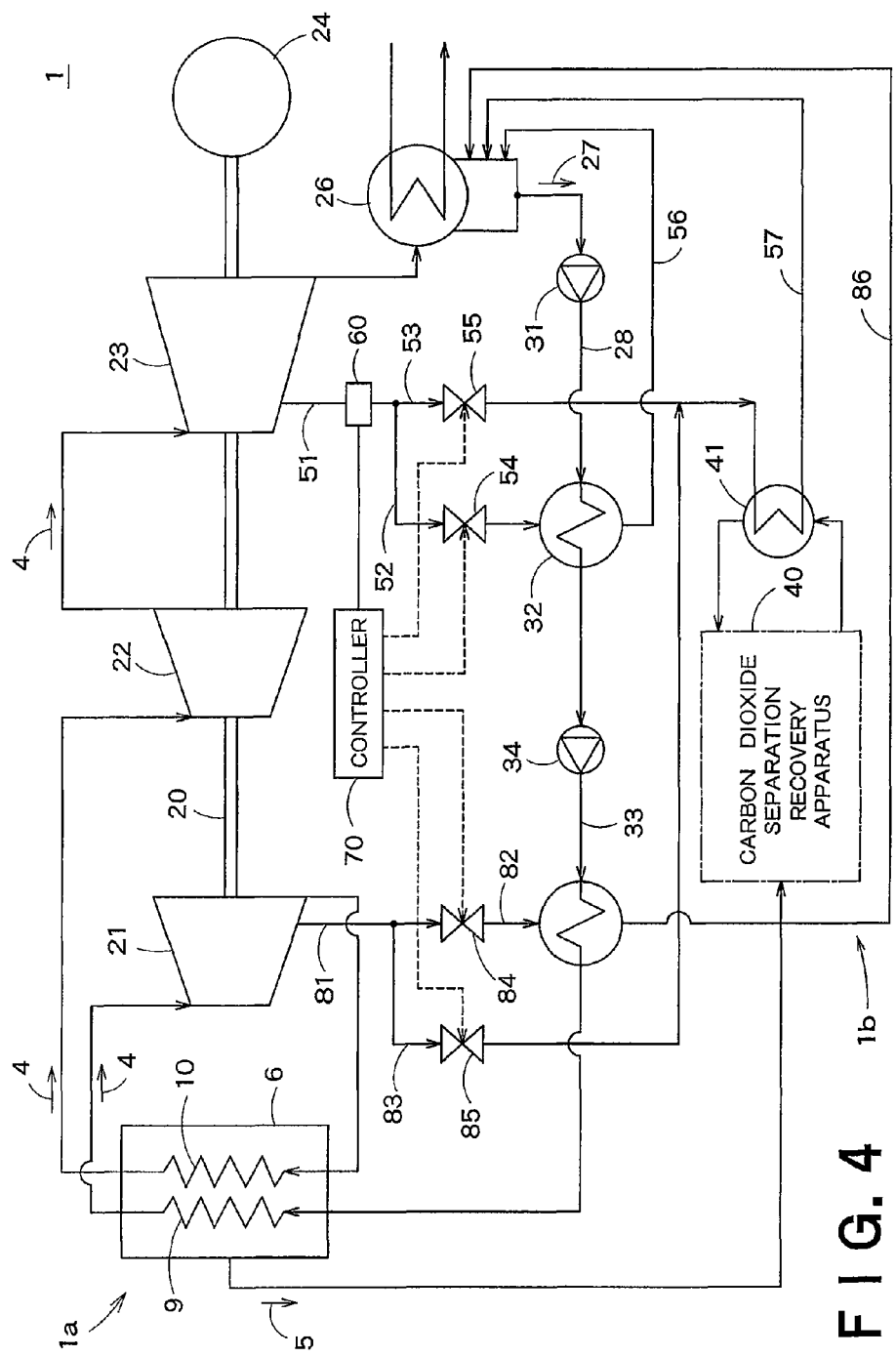
FIG. 4 is a diagram illustrating the schematic structure of a carbon-dioxide-recovery-type thermal power generation system according to a third embodiment of the invention.

FIG. 4 shows the schematic structure of a carbon-dioxide-recovery-type thermal power generation system according to a third embodiment of the invention. This embodiment is different from the first embodiment shown in FIG. 1 in that steam is extracted from a high-pressure turbine 21 and the extracted steam is used as a heat source of a heater 80 heating condensate 27 (water supplied to a boiler) and a heat source of a reboiler 41. In FIG. 4, the same portions as those of the first embodiment shown in FIG. 1 are denoted by the same reference numerals. The description thereof will not be repeated.

As shown in FIG. 4, a line 81 through which steam extracted from a high-pressure turbine 21 (hereinafter, referred to as high-pressure steam) flows is branched into lines 82 and 83. The high-pressure steam is supplied to a heater 80, which is provided on a line 33, through the line 82. A valve 85 is provided on the line 82, and is adapted to be capable of adjusting the amount of high-pressure steam that is supplied to the heater 80. The drain discharged from the heater 80 is supplied to a condenser 26 through a line 86.

The heater 80 heats the water supplied to a boiler, so that it is possible to reduce the fuel used to generate steam in the boiler 6. Therefore, it is possible to improve the thermal efficiency of a thermal power generation plant 1a.

The line 83 is connected to a line 53, so that a mixture of high-pressure steam and low-pressure steam is supplied to a reboiler 41. A valve (pressure reducing valve) 85 is provided on the line 83, and is adapted to be capable of adjusting the amount of high-pressure steam that is to be mixed to low-pressure steam.

A controller 70 controls the opening of valves 84 and 85 so that the amount of steam extracted from a high-pressure turbine 21 becomes constant. A flowmeter (not shown), which measures the amount of steam extracted from the high-pressure turbine 21, may be provided on the line 81, and the controller 70 may control the opening of the valves 84 and 85 on the basis of the measurement result of the flowmeter.

It is possible to improve the carbon dioxide discharging performance of the absorption liquid in the carbon dioxide separation recovery apparatus 40, as compared to the first embodiment, by supplying a mixture of low-pressure steam and high-pressure steam, of which temperature is higher than the temperature of the low-pressure steam, to the reboiler 41.

Further, it is possible to change the temperature of a mixture of steam by changing a mixing ratio of steam extracted from a plurality of turbines. When the absorption liquid used in the carbon dioxide separation recovery apparatus 40 is changed, it is possible to improve the performance of an absorption liquid by setting the temperature of a mixture of steam to a preferred temperature according to the kind of absorption liquid.

In this embodiment, the amount of steam extracted from the high-pressure turbine 21 and the low-pressure turbine 23 are made constant by the adjustment of the opening of the valves 54, 55, 84, and 85 when a mixture of the steam extracted from the high-pressure turbine 21 and the steam extracted from the low-pressure turbine 23 are supplied to the reboiler 41. For this reason, it is possible to change the flow rate of the steam supplied to the reboiler 41 while maintaining the amount of steam passing through the high-pressure turbine 21, the intermediate-pressure turbine 22, and the low-pressure turbine 23 constant.

Accordingly, it is possible to separate and recover carbon dioxide by the carbon-dioxide-recovery-type steam power generation system according to this embodiment while preventing the performance of a turbine from deteriorating.

In the third embodiment, steam has been extracted from the high-pressure turbine 21 and the low-pressure turbine 23. However, steam may be extracted from the intermediate-pressure turbine 22 and the low-pressure turbine 23, and steam may be extracted from the high-pressure turbine 21 and the intermediate-pressure turbine 22. Further, steam may be extracted from the high-pressure turbine 21, the intermediate-pressure turbine 22, and the low-pressure turbine 23.

A reheat cycle where the steam exhausted from the high-pressure turbine 21 is supplied to the intermediate-pressure turbine 22 after being heated in the boiler 6 has been applied to the first to third embodiments. However, steam exhausted from the high-pressure turbine 21 may be directly supplied to the intermediate-pressure turbine 22.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A carbon-dioxide-recovery-type thermal power generation system comprising:
    a boiler that produces steam and generates an exhaust gas by combusting fuel;
    an absorption column that is supplied with the exhaust gas from the boiler and allows carbon dioxide contained in the exhaust gas to be absorbed in an absorption liquid;
    a regeneration column that is supplied with the absorption liquid containing the absorbed carbon dioxide from the absorption column, allowing a carbon dioxide gas to be discharged from the absorption liquid, and discharges the carbon dioxide gas;
    a reboiler that heats the absorption liquid discharged from the regeneration column and supplies steam generated thereby to the regeneration column;
    a turbine that is supplied with the steam from the boiler and is rotationally driven;
    a condenser that generates condensate by cooling the steam exhausted from the turbine;
    a condensate pump that sends the condensate to a first line;
    a first heater that is provided on the first line and heats the condensate;
    a water supply pump that supplies the condensate, which has been heated by the heater, to the boiler;
    a second line through which steam extracted from the turbine is supplied to the reboiler and the first heater; and
    a steam flow rate adjusting unit that maintains an amount of steam, which is extracted from the turbine through the second line, to be constant.

2. The carbon-dioxide-recovery-type thermal power generation system according to claim 1,
    wherein the steam flow rate adjusting unit includes a valve that is provided on the second line and adjusts a flow rate of the steam of the second line according to an opening degree of the valve, and a controller that controls an opening degree of the valve.

3. The carbon-dioxide-recovery-type thermal power generation system according to claim 2,
    wherein the steam flow rate adjusting unit further includes a flowmeter that is provided on the second line and measures the flow rate of steam, and
    the controller controls the opening degree of the valve based on a measurement result of the flowmeter.

4. The carbon-dioxide-recovery-type steam power generation system according to claim 1,
    wherein the boiler includes a second heater that generates main steam and a reheater that generates reheat steam,
    the turbine includes a high-pressure turbine that is supplied with the main steam and is rotationally driven, an intermediate-pressure turbine that is supplied with the reheat steam and is rotationally driven, and a low-pressure turbine that is supplied with steam exhausted from the intermediate-pressure turbine and is rotationally driven, and
    the reboiler and the first heater are supplied with steam that is extracted from at least one of the high-pressure turbine, the intermediate-pressure turbine, and the low-pressure turbine.

5. The carbon-dioxide-recovery-type thermal power generation system according to claim 4,
    wherein the steam flow rate adjusting unit includes a valve that is provided on the second line and adjusts a flow rate of the steam of the second line according to an opening degree of the valve, and a controller that controls an opening degree of the valve.

6. The carbon-dioxide-recovery-type thermal power generation system according to claim 5,
    wherein the steam flow rate adjusting unit further includes a flowmeter that is provided on the second line and measures the flow rate of steam, and
    the controller controls the opening degree of the valve based on a measurement result of the flowmeter.

7. The carbon-dioxide-recovery-type thermal power generation system according to claim 1,
    wherein the turbine includes a high-pressure turbine that is supplied with the steam generated by the boiler and is rotationally driven, an intermediate-pressure turbine that is supplied with steam exhausted from the high-pressure turbine and is rotationally driven, and a low-pressure turbine that is supplied with steam exhausted from the intermediate-pressure turbine and is rotationally driven, and
    the reboiler and the first heater are supplied with the steam that is extracted from at least one of the high-pressure turbine, the intermediate-pressure turbine, and the low-pressure turbine.

8. The carbon-dioxide-recovery-type thermal power generation system according to claim 7,
    wherein the steam flow rate adjusting unit includes a valve that is provided on the second line and adjusts a flow rate of the steam of the second line according to an opening degree of the valve, and a controller that controls an opening degree of the valve.

9. The carbon-dioxide-recovery-type thermal power generation system according to claim 8,
wherein the steam flow rate adjusting unit further includes a flowmeter that is provided on the second line and measures the flow rate of steam, and
the controller controls the opening degree of the valve based on a measurement result of the flowmeter.

10. A method of operating a carbon-dioxide-recovery-type thermal power generation system, the method comprising:
generating steam, which drives a turbine, and generating an exhaust gas with a boiler;
allowing carbon dioxide, which is contained in the exhaust gas discharged from the boiler, to be absorbed in an absorption liquid in an absorption column;
allowing a carbon dioxide gas to be discharged from an absorption liquid containing the absorbed carbon dioxide in a regeneration column and discharging the carbon dioxide gas from the regeneration column;
heating the absorption liquid discharged from the regeneration column with a reboiler and supplying the steam regenerated to the regeneration column;
generating condensate by cooling steam, which is exhausted from the turbine, with a condenser;
heating the condensate with a heater;
supplying the heated condensate to the boiler with a pump;
extracting a constant amount of steam from the turbine; and
supplying the steam, which is extracted from the turbine, to at least one of the heater and the reboiler,
wherein the constant amount of steam is extracted from at least one of a high-pressure turbine, an intermediate-pressure turbine, and a low-pressure turbine that form the turbine.

11. A method of operating a carbon-dioxide-recovery-type thermal power generation system, the method comprising:
generating steam, which drives a turbine, and generating an exhaust gas with a boiler;
allowing carbon dioxide, which is contained in the exhaust gas discharged from the boiler, to be absorbed in an absorption liquid in an absorption column;
allowing a carbon dioxide gas to be discharged from an absorption liquid containing the absorbed carbon dioxide, in a regeneration column and discharging the carbon dioxide gas from the regeneration column;
heating the absorption liquid discharged from the regeneration column with a reboiler and supplying the steam regenerated to the regeneration column;
generating condensate by cooling steam, which is exhausted from the turbine, with a condenser;
heating the condensate with a heater;
supplying the heated condensate to the boiler with a pump;
extracting a constant amount of steam from the turbine;
supplying the steam, which is extracted from the turbine, to at least one of the heater and the reboiler;
measuring a flow rate of the steam that is extracted from the turbine; and
controlling an opening degree of valves, which are provided on pipes through which steam flows, the pipes being connected between the turbine and the heater, and between the turbine and the reboiler, based on a measurement result of the flow rate.

* * * * *